(12) United States Patent
Petschulat et al.

(10) Patent No.: US 10,831,757 B2
(45) Date of Patent: Nov. 10, 2020

(54) HIGH-DIMENSIONAL DATA MANAGEMENT AND PRESENTATION

(71) Applicant: salesforce.com, inc., San Francisco, CA (US)

(72) Inventors: Stephen Petschulat, Coquitlam (CA); Brittany Zenger, Coquitlam (CA); Lingtao Zhang, Coquitlam (CA); Chang Lu, Vancouver (CA); Yi Zhao Liu, Vancouver (CA); Daniel Scott Perry, Salt Spring Island (CA)

(73) Assignee: salesforce.com, inc., San Francisco, CA (US)

( * ) Notice: Subject to any disclaimer, the term of this patent is extended or adjusted under 35 U.S.C. 154(b) by 353 days.

(21) Appl. No.: 15/885,499

(22) Filed: Jan. 31, 2018

(65) Prior Publication Data

US 2019/0236191 A1    Aug. 1, 2019

(51) Int. Cl.
*G06F 16/24* (2019.01)
*G06F 16/2455* (2019.01)
*G06F 16/2457* (2019.01)

(52) U.S. Cl.
CPC .. *G06F 16/24553* (2019.01); *G06F 16/24578* (2019.01)

(58) Field of Classification Search
CPC .............. G06F 16/24553; G06F 16/24578
See application file for complete search history.

(56) References Cited

U.S. PATENT DOCUMENTS

| | | | |
|---|---|---|---|
| 2010/0180029 A1* | 7/2010 | Fourman | G06F 21/60 709/225 |
| 2012/0023101 A1* | 1/2012 | Heimendinger | G06F 16/248 707/737 |
| 2016/0034547 A1* | 2/2016 | Lerios | G06F 16/254 707/602 |
| 2016/0267147 A1* | 9/2016 | Seemann | G06F 16/9535 |
| 2017/0124149 A1* | 5/2017 | Li | G06F 16/2453 |
| 2017/0177660 A1* | 6/2017 | Chang | G06F 16/2425 |
| 2018/0276191 A1* | 9/2018 | Yamazoe | G06Q 10/103 |

* cited by examiner

*Primary Examiner* — Loc Tran
(74) *Attorney, Agent, or Firm* — Fenwick & West LLP

(57) ABSTRACT

An online system manages data by determining relevance of data dimensions to users. The online system determines which data dimensions a user is likely to be interested in. If a user requests to access a data set that includes data of different dimensions, the online system analyzes the dimensions' relevance to the user before providing the data set to the user. The online system provides the data to the user by prioritizing data dimensions that are more relevant to the user. As such, the online system improves the user experience by allowing users to conveniently and quickly locate relevant data and minimizing the distraction caused by irrelevant data. The online system may create and provide a user interface to present data dimensions that are determined to be relevant.

20 Claims, 4 Drawing Sheets

HIGH-DIMENSIONAL DATA MANAGEMENT AND PRESENTATION

BACKGROUND

Field of Art

The disclosure relates in general to high-dimensional data management and in particular to managing and presenting high-dimensional data based on relevance to users.

Description of the Related Art

Online systems often store large amount of data for enterprises. An online system may store data for a single enterprise or for multiple enterprises. For example, a multi-tenant system stores data for multiple tenants, each tenant potentially representing an enterprise. The data stored by an online system for an enterprise is typically high-dimensional data, such as records representing various entities associated with the entity, for example, user accounts, tasks and projects, documents, communications between users, media objects, and so on.

The high-dimensionality of the data poses a unique challenge for online systems in managing and preparing data for users. Users can view and comprehend a limited number of dimensions at a time. The number of dimensions that users work to accomplish a task is typically much smaller than the number of available dimensions. However, it may not be easy for users to determine which dimensions are relevant and should be used. Conventional online systems present all or a truncated list of dimensions that is usually determined based on metadata and is not driven by relevance, which hinders user experience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

System Overview

An online system manages data by determining relevance of data dimensions to users. The online system determines data of which data dimensions that the user is likely to have an interest. If a user requests to access a data set that includes data of different dimensions, the online system analyzes the dimensions' relevance to the user before providing the data set to the user. The online system provides the data to the user by prioritizing data dimensions that are more relevant to the user. As such, the online system improves the user experience by allowing users to conveniently and quickly locate relevant data and minimizing the distraction caused by irrelevant data. The online system may create and provide a user interface to present data dimensions that are determined to be relevant. In this way, users can configure to which dimensions of data should be presented. The online system determines relevance based on a variety of factors such as historical data usage, data of each dimension, changes in data of each dimension, and schemas of data tables.

Figure 1:
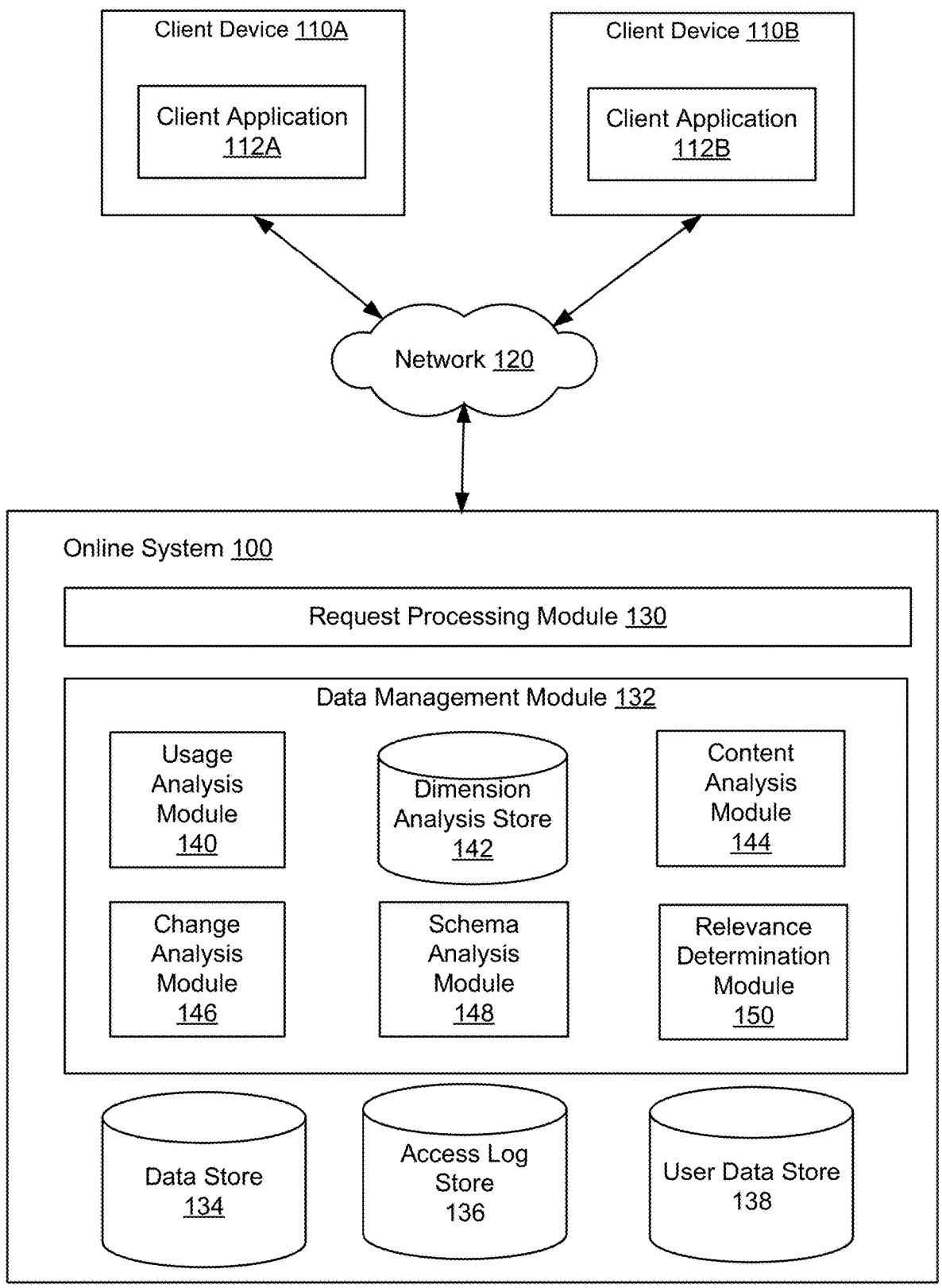
FIG. 1 shows an overall system environment illustrating an online system managing and presenting high-dimensional data, in accordance with an embodiment.

FIG. 1 shows an overall system environment illustrating an online system managing and presenting high-dimensional data, in accordance with an embodiment. As shown in FIG. 1, the overall system environment includes an online system 100, one or more client devices 110, and a network 120. Other embodiments may use more or fewer or different systems than those illustrated in FIG. 1. Functions of various modules and systems described herein can be implemented by other modules and/or systems than those described herein. FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A" and/or "120B" in the figures).

A client device 110 is used by users to interact with the online system 100. A user interacts with the online system 100 using client device 110 executing client application 112. For example, via the client application 112, users request to access data stored by the online system 100, analyzes data stored by the online system 100, searches for particular data dimension stored by the online system 100, provides data for analysis to the online system 100, provides scripts for running in the online system 100, and the like. An example of a client application 112 is a browser application. In an embodiment, the client application 112 interacts with the online system 100 using HTTP requests sent over network 120.

The online system 100 stores information associated with one or more organizations which are "tenants" of the multi-tenant online system 100. In general, a multi-tenant system stores data for multiple organizations. The information stored in connection with a tenant in the online system 100 includes data sets representing various entities associated with the tenant, for example, user accounts representing users, user groups representing a group of users, objects representing customers, patients, students, transactions, purchase orders, etc. The online system 100 provides functionality for users to interact with the information it stores, for example, the online system 100 provides data access functionality which a specific user of a specific tenant may use to access data stored for that tenant. The online system 100 typically store data in data tables that include many different data dimensions corresponding to different attributes of data. For example, a customer data table includes different data dimensions corresponding to different customer attributes such as first name, last name, middle name, age, education, location, house hold income, and the like. Furthermore, the online system 100 allows for the addition, removal, and manipulation of the data it stores according to rules depending upon the particular embodiment. In the interest of information security, multi-tenant systems such as the online system 100 partition data by organization, preventing users of one organization from accessing data of different organizations.

As an example, one tenant might be a company that employs a sales force where each salesperson uses a client device 110 to manage their sales process. Thus, a user might maintain contact data, leads data, customer follow-up data, performance data, goals and progress data, etc., all applicable to that user's personal sales process.

In one embodiment, online system 100 implements a web-based customer relationship management (CRM) system. For example, in one embodiment, the online system 100 includes application servers configured to implement and execute CRM software applications as well as provide related data, code, forms, webpages and other information to and from client devices 120 and to store to, and retrieve from, a database system related data, objects, and webpage content.

With a multi-tenant system, data for multiple tenants may be stored in the same physical database, however, tenant data typically is arranged so that data of one tenant is kept logically separate from that of other tenants so that one tenant does not have access to another tenant's data, unless such data is expressly shared. In certain embodiments, the online system 100 implements applications other than, or in addition to, a CRM application. For example, the online system 100 may provide tenant access to multiple hosted (standard and custom) applications, including a CRM application. According to one embodiment, the online system 100 is configured to provide webpages, forms, applications, data and media content to client devices 120 to support the access by client devices 120 as tenants of online system 100. As such, online system 100 provides security mechanisms to keep each tenant's data separate unless the data is shared.

A multi-tenant system may implement security protocols that keep data, applications, and application use separate for different tenants. In addition to user-specific data and tenant-specific data, the online system 100 may maintain system level data usable by multiple tenants or other data. Such system level data may include industry reports, news, postings, and the like that are sharable among tenants.

It is transparent to member users of organizations that their data may be stored in a table that is shared with data of other organizations. A database table may store data for a plurality of organizations. Accordingly, in a multi-tenant system various elements of hardware and software of the system may be shared by one or more organizations. For example, the online system 100 may execute an application server that simultaneously processes requests for a number of users of different organizations.

The online system 100 includes request processing module 130, a data management module 132, a data store 134, an access log store 136, and a user data store 138. The online system receives requests from users via the client device 110 over the network 120. The online system 100 directs them to the request processing module. A request includes one or more data operations. Example requests include a request to receive data, a request to store data, a data to transform data, a request to obtain data, a request to analyze data, and the like. The request processing module 130 processes these requests by performing the data operations defined in the requests. The request processing module returns processing results to the client device 110.

For example, the request processing module 130 processes the request to receive data by receiving the data from the client device 110. The data may include data from homogeneous or heterogeneous data sources.

The request processing module 130 processes the request to store data by receiving the data from the client device 110 and stores the data in the data store 134. The request processing module 130 stores data according to a schema defined by a user (or a group of users or a tenant.) The schema defines data categories that the data should be stored. A data table may have a well-defined schema describing its dimensions. For example, an account table may have an id, name, number, industry type, billing address etc. A contact table may have an id, first name, last name, phone, email etc. A case table may have a number, account id, status (open, in-progress, closed) etc. The request processing module 130 stores the receive data in one or more data tables. A data table includes one or more data categories that are logically arranged as columns or fields. Each row or record of a data table includes an instance of data for each category defined by the fields. For example, a customer data table stores data about customers and includes fields for basic contact information such as name, address, phone number, fax number, etc. A purchase order data table stores data regarding purchase orders and includes fields for information such as customer, product, sale price, date, etc.

The request processing module 130 processes the request to transform data by converting data from one format or structure to another format or structure.

The request processing module 130 processes the request to obtain data by obtaining data stored from the data store 134. The data can include data stored in a data table entirely or a portion thereof such as data stored in particular columns or data stored in particular rows. The request processing module may return the obtained data to the client device 110 or to a destination as specified in the request.

The request processing module 130 processes the request to analyze data by analyzing the data according to one or more rules or functions specified in the request. The request processes module 130 applies the one or more rules or functions specified in the request to data. As one example, the request processing module 130 clusters of a column of user age data according to a rule defining age groups. As another example, the request processing module 130 combines two columns of data.

In an embodiment, data requests are received in the form of scripts. A script is written in a scripting language for executing one or more data requests. A script can be an ETL (extract, transform, load) script. In some embodiments, a script is generated by a tool (e.g., a visual tool) that allows user to analyze data.

The request processing module 130 may further log the access information in an access log store 136. The request processing module 130 creates a log event for each request. The request processing module 130 may also enrich events with additional metadata such as a user ID, a group ID identifying groups to which the user belongs, a tenant ID identifying a tenant to which the user belongs, a script ID identifying a script associated with the request, a schema associated with the request, a schema associated with a script, a priority associated with the script, etc. The request processing module 130 publishes these events as log lines to the access log store 136.

The data management module 132 manages the data that is processed by the request processing module 130. In particular, the data management module 132 manages dimensions of the data according to their relevance to the user. A relevance of a dimension of data to the user is a likelihood of the user being interested in the data. The data management module 132 determines relevance of data dimensions to different users based on one or more analyses. For example, the data management module 132 analyzes usage of data and determines the relevance based on the usage analysis. As another example, the data management module 132 analyzes the data of each dimension and determines the relevance based on the data analysis. As a further example, the data management module 132 analyzes changes to the data of each dimension over time and determines the relevance based on the change to the data analysis. As yet a further example, the data management module 132 analyzes a schema for a data table and determines the relevance of data dimensions of the data table based on the schema analysis. For a particular user or tenant, the data management module 132 may perform one or multiple analyses and determines the relevance based on the performed analyses. The analyses may be configured by the user or tenant. The data management module 132 can perform the same or different analyses for different users or tenants.

The data management module 132 includes a usage analysis module 140, a dimension analysis store 142, a content analysis module 144, a change analysis module 146, a schema analysis module 148, and a relevance determination module 150, all of which are further described below. The usage analysis module 140 tracks and analyzes the usage of data of different dimensions that is stored in different data tables. For example, for a particular data dimension (e.g., a column) of a data table, the usage analysis module 140 tracks a total count of the data of that column being accessed by a user within a time interval. The usage analysis module 140 can obtain access logs from the access log store 136 that include a user ID identifying the user requesting to access the data, data operations included in the request, a data table that is being accessed, a data dimension that is being accessed, and a script ID identifying a script including the request. Similarly, the usage can be tracked for a group of users or for a tenant.

The usage analysis module 140 analyzes the usage of data of different data dimensions by analyzing the access information. In particular, the usage analysis module 140 analyses the access information to determine how users use data of different dimensions. The usage analysis module 140 determines a rate of data of a particular dimension being accessed, a rate of data of the particular dimension being accessed by a particular user (a group of users or a tenant), a rate of data of the particular dimension being accessed by a script, and the like. For example, the usage analysis module 140 determines a total number of times data of a data dimension being accessed within a time interval, a total number of times data of the data dimension being accessed by a user (a group of users or a tenant) within a time interval, a total number of times data of the data dimension being accessed by a script within a time interval, and the like.

The usage analysis module 140 determines that a derived dimension and an original dimension based on which the derived dimension is created share the same access information. That is, if the original dimension (or the derived dimension) is accessed once, the usage analysis module 140 determines that the derived dimension (or the original dimension) is accessed once.

The usage analysis module 140 stores the usage analysis in the dimension analysis store 142. In the dimension analysis store 142, derivative dimensions are associated with the original dimension based on which the derivative dimensions are created. In some embodiments, the usage analysis module 140 represents the analysis results in features. A feature is identified by a feature ID and includes a set of attributes.

The dimension analysis store 142 stores content analysis results by the content analysis module 144, data change analysis results by the change analysis module 146, and the schema analysis results by the schema analysis results module 148.

The analysis results stored in the dimension analysis store 142 provides information for the relevance determination module 150 to determine relevance of data dimensions to users as further described below.

The content analysis module 144 analyzes the data stored in each column. For example, for a particular column, the content analysis module 144 analyzes a data type, a redundancy, a data size of each piece of data, and the like.

The data change analysis module 146 analyzes changes in the data stored in each column over time. For example, for a particular column, the data change analysis module 146 determines an amount of change in the data within a time interval, a type of change within a time interval, and the like.

The schema analysis module 148 analyzes a schema requested by a script to determine whether the schema includes predetermined dimensions. For example, the data change analysis module 148 compares metadata associated with each column in the schema to predetermined metadata to determine matches. Metadata of a schema may include links or references to a website or to another dimension. If a schema includes a dimension that stores data referring to a particular cloud solution, then the dimension is a predetermined dimension.

The relevance determination module 150 determines relevance of data dimension to users based at least on the information stored in the dimension analysis store 142. For example, if a user requests to access data of multiple dimensions, the relevance determination module 150 determines each dimension's relevance to the user based at least on the usage analysis. One dimension that is accessed more frequently (or times) than another dimension is likely to be more relevant to the user than the other dimension. The relevance determination module 150 determines a dimension's relevance to the user based further on the user information or on the script information. For example, one dimension that is accessed more frequently (or times) than another dimension by a user is likely to be more relevant to the user than the other dimension. If one dimension that is accessed more frequently (or times) than another dimension by a group of users that are similar to a user is likely to be more relevant to the user than the other dimension. A group of users that are similar to each other can be evaluated by their titles, business units, associated tenant, and the like. As a further example, one dimension that is accessed more frequently (or times) than another dimension by scripts that a user uses is likely to be more relevant to the user than the other dimension. One dimension that is accessed by a script of a higher priority than another dimension accessed by another script of a lower priority is likely to be more relevant to the user than the other dimension. Between a first dimension that is accessed by a first script and a second dimension that is accessed by a second script where the first script is executed more frequently (or times) than the second script, the first dimension is likely to be more relevant to a user than the second dimension. The user information can be obtained from the user data store 138 and the script information can be obtained from the access log store 136.

The relevance determination module 150 may determine a dimension's relevance to the user based further on the tenant information. For example, one dimension that is accessed more frequently (or times) than another dimension by a tenant is likely to be more relevant to a user for that tenant. A group of tenants that are similar to each other can be evaluated by their industries, amount of data shared, and the like. One dimension that is accessed more frequently (or times) than another dimension by a group of tenants that are similar to a tenant is likely to be more relevant to a user for that tenant. For users of a new tenant where usage information is not available, the relevance determination module 150 can leverage using usage information of other tenants related to the same data as the new tenant. The tenant information can be obtained from the user data store 138.

The relevance determination module 150 may determine relevance scores for dimensions. A dimension with a higher score is more relevant to a user than another dimension with a lower score.

The relevance determination module 150 may determine weights for attributes as well as features and assigns scores for the features representing different analyses and attributes of the features. Different features and their attributes are of different importance to the overall measure of relevance of a dimension to a user. The differences in the importance of different features and their attributes in a dimension's relevance with regards to a user are represented as weights. Each attributes and each feature is scored according to its contribution to a dimension's relevance to a user, then those scores are weighted and combined to create a relevance score for the dimension.

For example, a first feature represents that dimension A is accessed more frequently by a user than dimension B, a second feature represents that dimension B is accessed by scripts of higher priority than those accessing dimension A, and the second feature is historically is more important to determining a column's relevance than the first feature, then the second feature is associated with a higher weight than the first feature.

Feature (or attribute) weights may be determined by analysis of relevance determination and training models. This can be done using machine learning. Dimensionality reduction (e.g., via linear discriminant analysis, principle component analysis, etc.) may be used to reduce Machine learning algorithms used include support vector machines (SVMs), boosting for other algorithms (e.g., AdaBoost), neural net, logistic regression, naive Bayes, memory-based learning, random forests, bagged trees, decision trees, boosted trees, boosted stumps, etc.

Random forest classification based on predictions from a set of decision trees may be used to train a model. Each decision tree splits the source set into subsets based on an attribute value test. This process is repeated in a recursive fashion. A decision tree represents a flow chart, where each internal node represents a test on an attribute. For example, if the value of an attribute is less than or equal to a threshold value, the control flow transfers to a first branch and if the value of the attribute is greater than the threshold value, the control flow transfers to a second branch. Each branch represents the outcome of a test. Each leaf node represents a class label, i.e., a result of a classification.

Each decision tree uses a subset of the total predictor variables to vote for the most likely class for each observation. The final random forest score is based on the fraction of models voting for each class. A model may perform a class prediction by comparing the random forest score with a threshold value. In some embodiments, the random forest output is calibrated to reflect the probability associated with each class.

The feature (or attribute) weights for determining dimensions' relevance to users for different tenants, or for users of different groups may be different. Accordingly, a different machine learning model may be trained for each group of users or for different tenants. Alternatively, instead of machine learning, depending upon embodiment, the system may use other techniques to adjust the feature (or attribute) weights. For example, if a lower scored dimension is accessed more by a user than a higher scored dimension, weights corresponding to features (or attributes) that favor the lower scored dimension are increased and weights corresponding features (or attributes) that favor the higher scored dimension are decreased.

In an embodiment, the information stored in the dimension analysis store 142 is provided as a labeled training dataset for training the machine learning model configured to determine feature (or attribute) weights. The relevance determination module 150 includes a learning algorithm that accurately selects and stores subset of useful features (or attributes) from the training data. This learning algorithm includes an objective function which measures importance of collection of features. This objective function can be optimized (maximization or minimization) depending upon the type of function. Optimization to this function is usually done by humans.

The relevance determination module 150 determines that a first column storing data of a first data type is more relevant to a user than a second column storing data of a second data type, that a first column storing less-redundant data is more relevant to a user than a second column storing more-redundant data, or that a first column storing data of a less size is more relevant to a user than a second column storing data of a greater size.

The relevance determination module 150 determines that a first column storing data that changes more within a time interval is more relevant to a user than a second column storing data that changes less within the time interval, or that a first column storing data that includes a first type of change is more relevant to a user than a second column storing data that includes a second type of changes.

The relevance determination module 150 determines a predetermined dimension is more relevant to a user than an unidentified dimension.

For each dimension that a user requests to access, the relevance determination module 150 may determine a relevance measure for the dimension. In an embodiment, the relevance determination module 150 determines a relevance measure based on a weighted aggregate of the features describing usage of data of the dimension, the data, changes in the data over time, and/or a schema defining the data table. Each feature is weighted based on a feature weight associated with the feature.

In some embodiments, the data management module 132 selects the dimensions of which the relevance measures are greater than a threshold measure as relevant to the user. The data management module 132 may rank the selected dimensions base on the relevance measures. The data management module 132 interfaces with the request processing module 130 to present the dimensions based on the ranking or to present data based on the ranking of the dimensions. For example, the online system 100 provides a user interface presenting the dimensions in an order as ranked before providing the data for presentation to the user. In this way, the user can preview the dimensions determined as relevant and data of the dimensions and select certain dimensions for further analysis. As another example, the online system may order the data according to the dimensions associated with the data. Data of a more relevant dimension is presented at a higher priority than data of a less relevant dimension.

The relevance determination module 150 may adjust the feature (or attribute) weights to improve the ranking of dimensions. In an embodiment, the relevance determination module 150 modifies the feature (attribute) weights and measures the impact of the modification by applying the new feature weights to past relevance determinations and analyzing the newly ranked results. The online system stores information describing past relevance determinations. The stored information comprises, for each stored request, the request and the set of relevant dimensions returned in response to the request. The online system 100 monitors which dimensions were selected by the user for a particular request.

In an embodiment, the online system 100 optimizes the set of features weights for each tenant of a multi-tenant system. This is because each tenant may have a different usage pattern for the search results. Accordingly, search results that are relevant for a first tenant may not be very relevant for a second tenant. Therefore, the online system determines a first set of feature weights for the first tenant and a second set of feature weights for the second tenant.

The user data store 138 stores user data including a user ID identifying a user and information about the user such as a user group to which the user belongs, a title, a tenant associated with the user, demographic information, and the like. The online system 100 further stores information of tenants in the user data store 138. Each tenant may be an enterprise as described herein. As an example, one tenant might be a company that employs a sales team where each salesperson uses a client device 110 to manage their sales process. Thus, a user might maintain contact data, leads data, customer follow-up data, performance data, goals, and progress data, etc., all applicable to that user's personal sales process.

The online system 100 and client devices 110 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, etc. The online system 100 stores the software modules storing instructions, for example search module 130.

The interactions between the client devices 110 and the online system 100 are typically performed via a network 120, for example, via the Internet. In one embodiment, the network uses standard communications technologies and/or protocols. In another embodiment, various devices, and systems can use custom and/or dedicated data communications technologies instead of, or in addition to, the ones described above. The techniques disclosed herein can be used with any type of communication technology, so long as the communication technology supports receiving by the online system 100 of requests from a sender, for example, a client device 110 and transmitting of results obtained by processing the request to the sender.

System Processes

The processes associated with searches performed by online system 100 are described herein. The steps described herein for each process can be performed in an order different from those described herein. Furthermore, the steps may be performed by different modules than those described herein.

Figure 2:
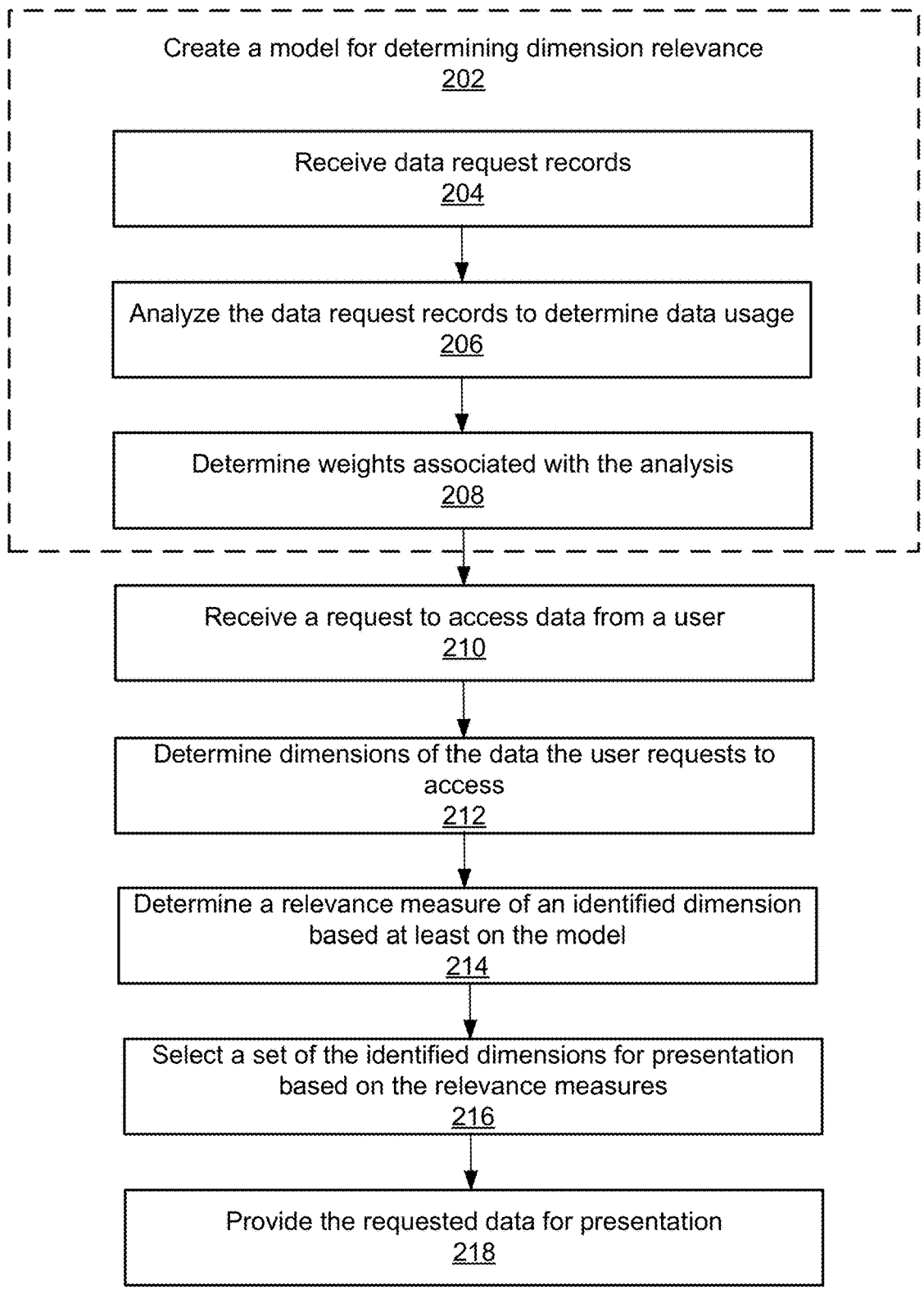
FIG. 2 shows the process of managing high-dimensional data, in accordance with an embodiment.

FIG. 2 shows the process of managing high-dimensional data, in accordance with an embodiment. The online system 100 creates a model for determining relevance of dimensions to users. The online system 100 receives 204 data request records that include information describing a plurality of users' requests to access data stored in a plurality of data tables. A data request record can be a log event. The online system 100 receives requests from users for accessing data, processes the requests by performing data operations, and creates log events for the requests.

The online system 100 analyzes the data request records to determine data usage. The online system 100 analyzes the usage of data of different dimensions that is stored in different data tables. For example, the online system 100 determines a rate of data of a particular dimension being accessed, a rate of data of the particular dimension being accessed by a particular user (a group of users or a tenant), a rate of data of the particular dimension being accessed by a script, a total number of times data of a data dimension being accessed within a time interval, a total number of times data of the data dimension being accessed by a user (a group of users or a tenant) within a time interval, a total number of times data of the data dimension being accessed by a script within a time interval, and the like.

The online system 100 may also analyze data stored in each column of data tables, changes in the data stored in each column over time, and a schema of a data table when creating the model.

The online system 100 determines 208 weights associated with the analysis. The online system 100 represents the analysis results in features. The online system 100 determines weights that represent differences in the importance of different features and their attributes in a dimension's relevance with regards to a user. Different features and their attributes are of different importance to the overall measure of relevance of a dimension to a user. The online system 100 may determine the weights by using machine learning.

The online system 100 receives 210 a request to access data from a user. For example, the online system 100 receives a script including a sequence of requests.

The online system 100 determines 212 dimensions of the data that the user requests to access. For example, the online system 100 determines the dimensions based on the information included in the request. The request includes information specifying a set of data tables and a set of dimensions where the data is stored.

The online system 100 determines a relevance measure for each identified dimension. For example, the online system 100 obtains user data associated with the user, script data associated the script if the online system 100 receives one, and applies the model to the user data and/or script data. In addition, the online system 100 may further identify a set of users that are similar to the user and obtain user data associated with the set of users, and/or a set of tenants that are similar to the tenant with whom the user is associated and obtain tenant data associated with the set of tenants; and applies the model to the user data of the set of users and/or tenant data associated with the set of tenants. The data that the user requests is shared by the set of tenants and the tenant.

For example, the online system 100 identifies the user's usage of data dimensions from the model, and determines the relevance measure of the data dimension based at least on the user's usage of data dimensions. The online system 100 determines a group of users that are similar to the user, identifies the group of users' usage of data dimensions from the model, and determines the relevance measure of the data dimension based at least on the group of users' usage of data dimensions. The online system 100 identifies the script's usage of data dimensions from the model, and determines the relevance measure of the data dimension based at least on the script's usage of data dimensions.

The online system 100 selects 216 a set of dimensions for presentation based on the relevance measures. In some embodiments, the online system 100 selects all identified dimensions. In some embodiments, the online system 100 selects dimensions that are associated with relevance measures greater than a threshold. In some embodiments, the online system 100 ranks the dimensions according to the determined relevance measures and selects the highest ranked dimension or top ranked dimensions.

The online system 100 provides 218 the requested data for presentation. The online system 100 may provide the requested data for presentation according to the ranking of the dimensions. That is, data of a higher-ranked dimension is presented at a higher priority than data of a lower-ranked dimension. In some embodiments, the online system 100 provides the selected set of dimensions for presentation to the user before providing the requested data. The online system 100 may generate and provide a user interface for presentation to the user. The user interface presents the selected set of dimensions to the user allows the user to select one or more data dimensions. The online system 100 provides the data of the user-selected dimensions for presentation to the user.

In an embodiment, the online system is a multi-tenant system and the entity type relevance scores are determined for each tenant separately.

Figure 3:
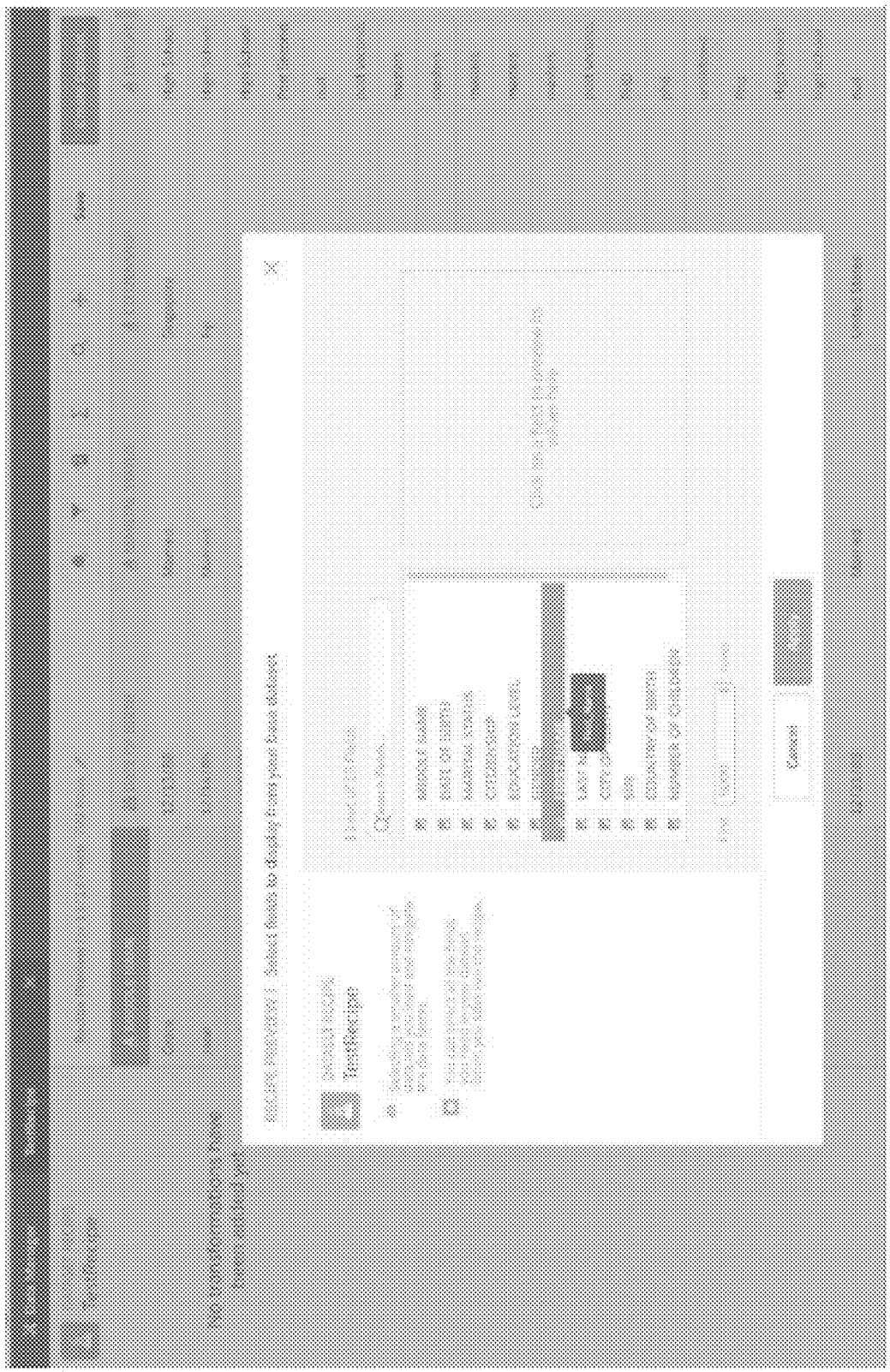
FIG. 3 shows a screen shot of a user interface for presenting data dimensions, in accordance with an embodiment.

FIG. 3 shows a screen shot of a user interface that presents data dimensions based on relevance, in accordance with an embodiment. In this embodiment the client application 112 comprises a browser. As seen in the figure, a user creates a script "TestRecipe" to access employee data. The user data includes many different dimensions corresponding to different attributes of the employees. The online system 100 determines that out of all dimensions, 13 dimensions are relevant to the user. The online system 100 presents a user interface presenting the 13 dimensions in an order according to their associated relevance. The user interface allows the user to select to preview actual data stored under each dimension. The user interface also includes an input element (e.g., a text box) that allows the user to search for a particular dimension.

Computer Architecture

Figure 4:
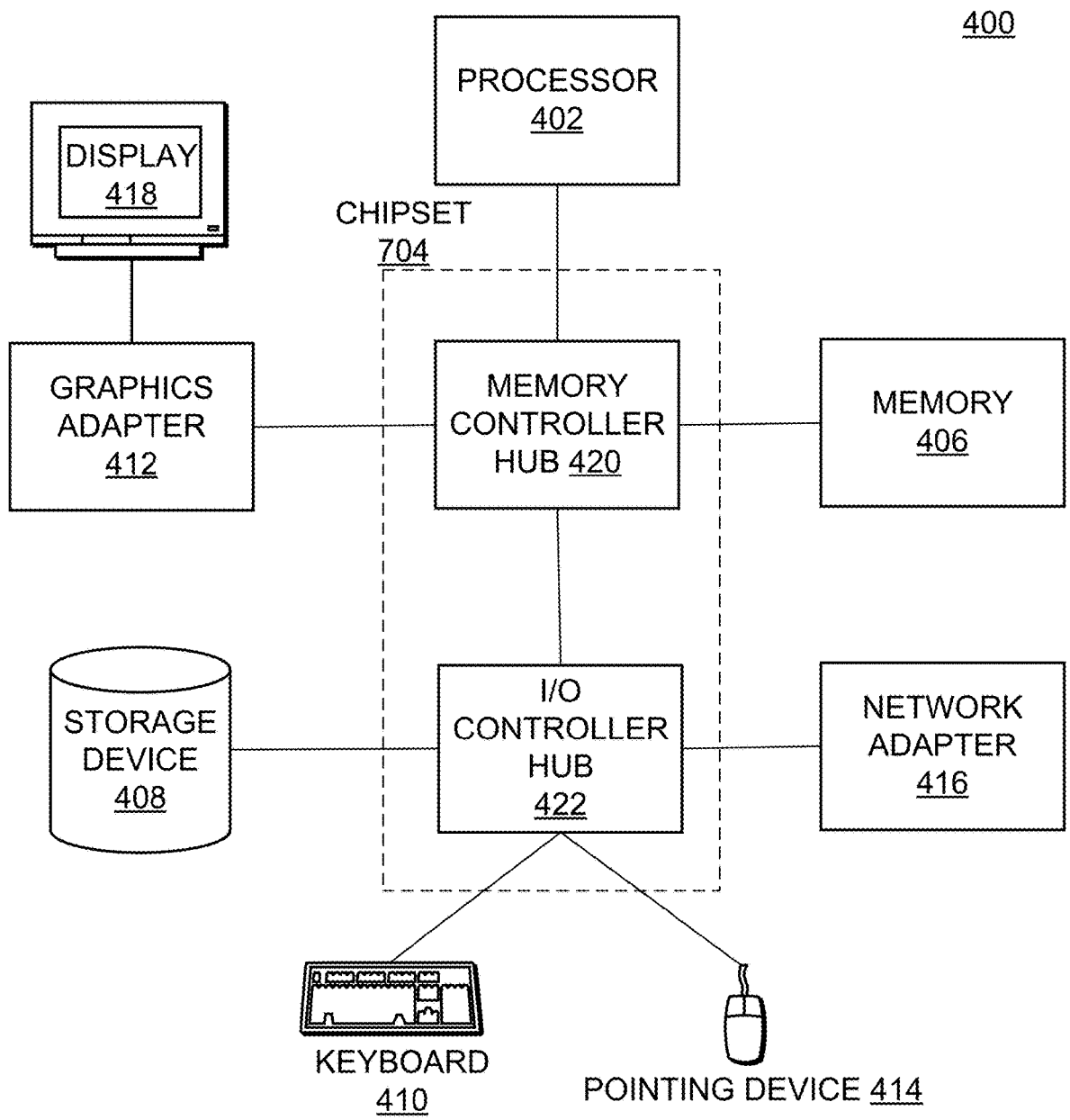
FIG. 4 shows a high-level block diagram of a computer for processing the methods described herein.

The entities shown in FIG. 1 are implemented using one or more computers. FIG. 4 is a high-level block diagram of a computer 400 for processing the methods described herein. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to the network 120.

As is known in the art, a computer 400 can have different and/or other components than those shown in FIG. 4. In addition, the computer 400 can lack certain illustrated components. For example, the computer acting as the online system 100 can be formed of multiple blade servers linked together into one or more distributed systems and lack components such as keyboards and displays. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method of managing data records, comprising:
   receiving a request to access a set of data stored in a data table from a user;
   identifying one or more data dimensions of the set of data requested by the user;
   for each identified data dimension: determining a user specific relevance measure of the data dimension to the user, wherein the user specific relevance measure indicates a likelihood of the user's interest in the data dimension, determining the user specific relevance measure comprising:
      determining a set of users similar to the user based on a matching of one or more attributes;
      determining a value representing usage of the data dimension by the set of users; and
      determining the user specific relevance measure by providing the value representing usage of the data dimension as input to a machine learning model configured to determine user specific relevance of an input data dimension,
         the machine learning model trained using data request records including information describing requests to access data, each data request record associated with a set of data tables and a set of data dimensions;
   selecting a set of data dimensions from the one or more identified data dimensions based at least on the user specific relevance measure associated with each identified data dimension; and
   providing the set of data dimensions for presentation to the user.

2. The computer-implemented method of claim 1, further comprising creating the machine learning model by analyzing the data request records to determine usage of data dimensions of the set of data tables, wherein the model stores the usage of the data dimensions of the set of data tables.

3. The computer-implemented method of claim 1, wherein determining the user specific relevance measure further comprises:
   obtaining user data associated with the user, wherein the user data is provided as input to the machine learning model in addition to the value representing usage of the data dimension.

4. The computer-implemented method of claim 1, wherein receiving the request to access a set of data from a user comprises receiving a script including the request and wherein determining the user specific relevance measure further comprises:
   obtaining script data associated the script, wherein the script data is provided as input to the machine learning model in addition to the value representing usage of the data dimension.

5. The computer-implemented method of claim 1, wherein receiving the request to access a set of data from a user comprises receiving a script including the request and wherein determining the user specific relevance measure further comprises:
   identifying the script's usage of data dimensions; and
   providing the script's usage of a data dimension in addition to the value representing usage of the data dimension as input to the machine learning model to determine the user specific relevance measure of the data dimension.

6. The computer-implemented method of claim 1, wherein the user specific relevance measure of each selected data dimension is above a threshold.

7. The computer-implemented method of claim 1, wherein providing the set of data dimensions for presentation to the user comprises:
   ranking the set of data dimensions into an order according to the relevance measure; and
   providing the set of data dimensions according to the ranked order.

8. The computer-implemented method of claim 1, wherein usage of data dimensions of the set of data tables associated with the data request records are represented by features in the machine learning model and each feature is associated with a weight in the machine learning model.

9. The computer-implemented method of claim 1, wherein training the machine learning model for determining user specific relevance of data dimensions further comprises analyzing data of each data dimension of each of the set of data tables associated with the data request records, wherein the machine learning model further stores the analysis of the data.

10. The computer-implemented method of claim 1, wherein training the machine learning model for determining user specific relevance of data dimensions further comprises analyzing a change of data of each data dimension of each of the set of data tables associated with the data request records, wherein the model further stores the analysis of change of data.

11. The computer-implemented method of claim 1, wherein training the machine learning model for determining user specific relevance of data dimensions further comprises analyzing a schema of each of the set of data tables associated with the data request records, wherein the model further stores the analysis of the schema.

12. A non-transitory computer-readable storage medium storing computer program instructions executable by a processor to perform operations comprising:
  receiving a request to access a set of data stored in a data table from a user;
  identifying one or more data dimensions of the set of data requested by the user;
  for each identified data dimension: determining a user specific relevance measure of the data dimension to the user, wherein the user specific relevance measure indicates a likelihood of the user's interest in the data dimension, determining the user specific relevance measure comprising:
    determining a set of users similar to the user based on a matching of one or more attributes;
    determining a value representing usage of the data dimension by the set of users; and
    determining the user specific relevance measure by providing the value representing usage of the data dimension as input to a machine learning model configured to determine user specific relevance of an input data dimension,
      the machine learning model trained using data request records including information describing requests to access data, each data request record associated with a set of data tables and a set of data dimensions;
  selecting a set of data dimensions from the one or more identified data dimensions based at least on the user specific relevance measure associated with each identified data dimension; and
  providing the set of data dimensions for presentation to the user.

13. The non-transitory computer storage medium of claim 12, further storing computer program instructions that cause the processor to further perform operations comprising: creating the machine learning model by analyzing the data request records to determine usage of data dimensions of the set of data tables, wherein the model stores the usage of the data dimensions of the set of data tables.

14. The non-transitory computer storage medium of claim 12, wherein the computer program instructions that cause the processor to perform receiving the request to access a set of data from a user comprises instructions for receiving a script including the request and wherein the computer program instructions that cause the processor to perform determining the user specific relevance measure further comprises instructions for:
  identifying the script's usage of data dimensions; and
  providing the script's usage of a data dimension in addition to the value representing usage of the data dimension as input to the machine learning model to determine the user specific relevance measure of the data dimension.

15. The non-transitory computer storage medium of claim 12, wherein the computer program instructions that cause the processor to perform providing the set of data dimensions for presentation to the user comprises instructions for:
  ranking the set of data dimensions into an order according to the relevance measure; and
  providing the set of data dimensions according to the ranked order.

16. The non-transitory computer storage medium of claim 12, wherein the computer program instructions that cause the processor to perform training the machine learning model for determining user specific relevance of data dimensions further comprises instructions for analyzing a schema of each of the set of data tables associated with the data request records, wherein the model further stores the analysis of the schema.

17. The method of claim 1, wherein the set of users has a single element corresponding to the user.

18. The method of claim 1, wherein the set of users is a tenant of a multi-tenant system, wherein the user is associated with the tenant.

19. The method of claim 1, wherein the set of users includes a plurality of users similar to the user.

20. The method of claim 19, wherein the set of users similar to the user have one or more of following match with the user: a title, a business unit, or tenant.

* * * * *

UNITED STATES PATENT AND TRADEMARK OFFICE
CERTIFICATE OF CORRECTION

PATENT NO. : 10,831,757 B2
APPLICATION NO. : 15/885499
DATED : November 10, 2020
INVENTOR(S) : Petschulat et al.

Page 1 of 1

It is certified that error appears in the above-identified patent and that said Letters Patent is hereby corrected as shown below:

In the Claims

In Column 16, in Claim 17, Line 41, delete "method" and insert -- computer-implemented method --, therefor.

In Column 16, in Claim 18, Line 43, delete "method" and insert -- computer-implemented method --, therefor.

In Column 16, in Claim 19, Line 46, delete "method" and insert -- computer-implemented method --, therefor.

In Column 16, in Claim 20, Line 48, delete "method" and insert -- computer-implemented method --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*